Sept. 26, 1967 W. A. LA ROSA ETAL 3,343,404
NON-DESTRUCTIVE QUICK LEAK TESTER
Filed Feb. 10, 1965 4 Sheets-Sheet 1

INVENTORS
WILLIAM A. LA ROSA
JAMES A. SARGEANT
EDGAR P. TROEGER
By Robert O.
Richardson
ATTORNEY INVENTORS
WILLIAM A. LA ROSA
JAMES A. SARGEANT
EDGAR P. TROEGER
BY Robert O. Richardson
ATTORNEY

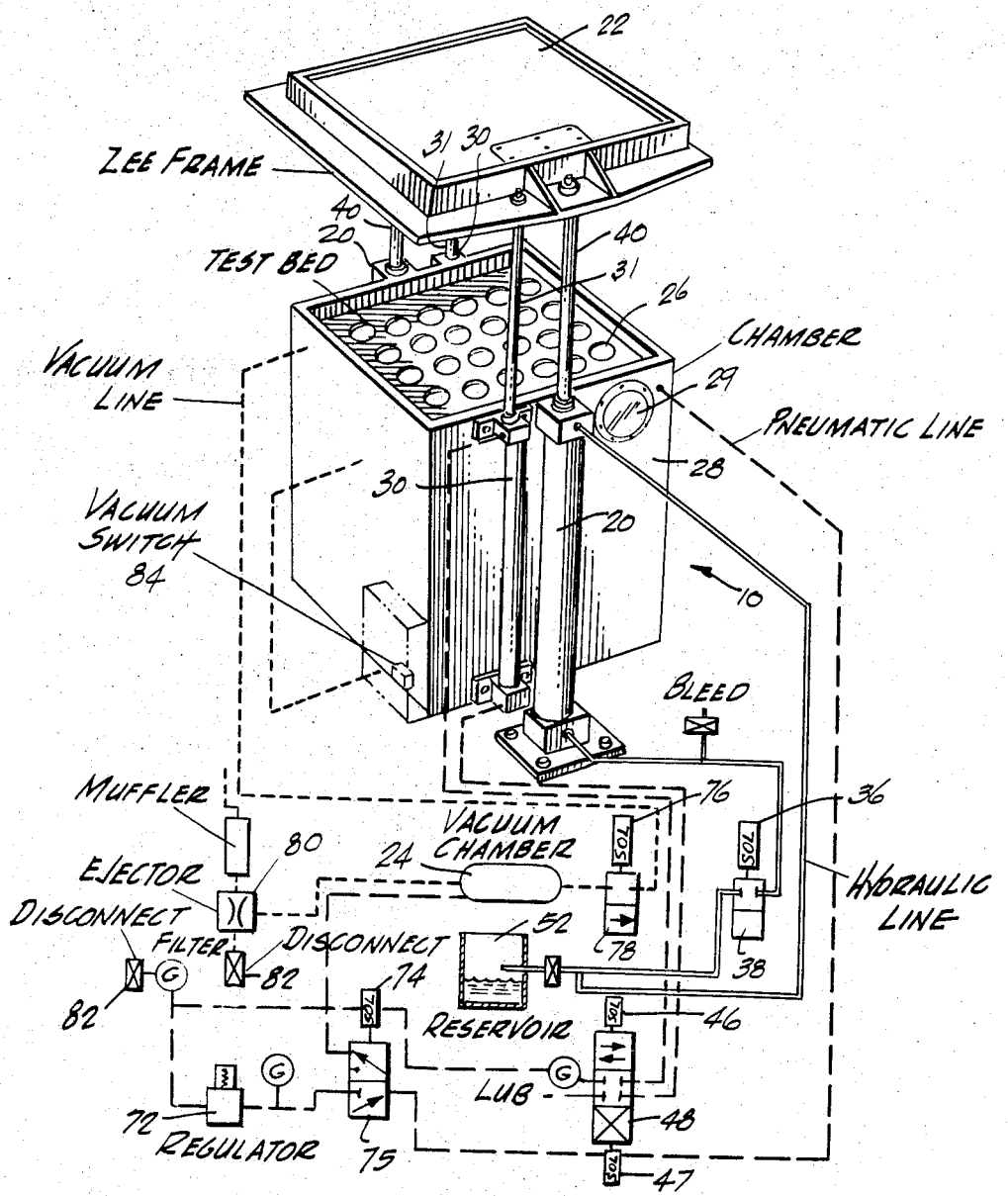

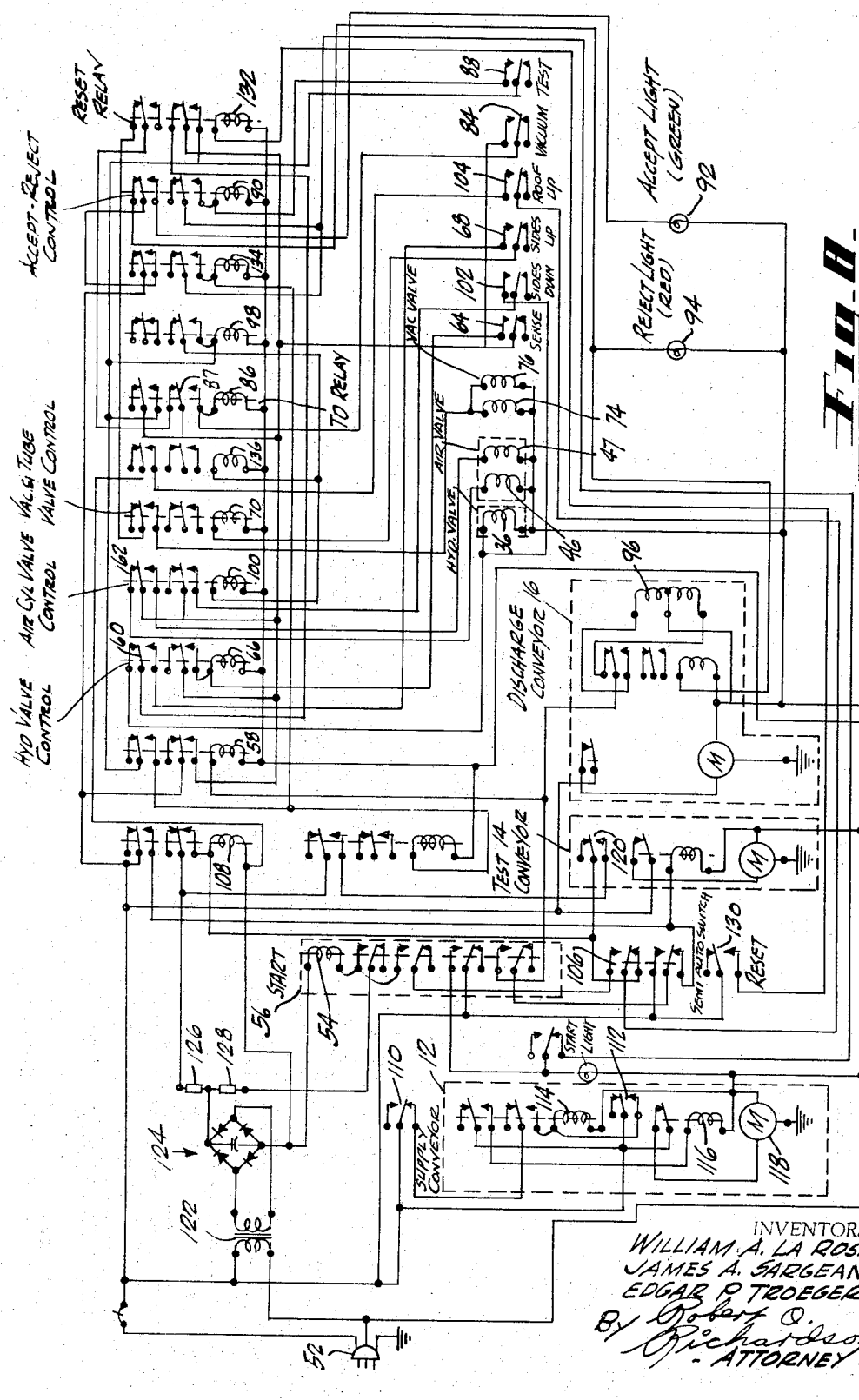

United States Patent Office 3,343,404
Patented Sept. 26, 1967

3,343,404
NON-DESTRUCTIVE QUICK LEAK TESTER
William A. La Rosa, Canoga Park, and James A. Sargeant and Edgar P. Troeger, Los Angeles, Calif., assignors, by mesne assignments, to McDonnell Douglas Corporation, Santa Monica, Calif., a corporation of Maryland
Filed Feb. 10, 1965, Ser. No. 431,625
4 Claims. (Cl. 73—49.3)

ABSTRACT OF THE DISCLOSURE

A non-destructive quick leak tester wherein a sealed test package is placed in an air-tight compartment, a vacuum is drawn in the compartment, and the amount of resultant bulging is detected, thereby noting the integrity of the package. The volume of the compartment is automatically kept small by adjusting the roof of the compartment vertically. A sensor on the roof indicates the amount of bulging of the package.

Background of the invention

The principles of this invention have application in apparatus for testing of an airtight seal in a package. The problem is to determine whether the package leaks or whether the leak is of sufficient size to cause the package to be rejected for further use in its present form. The package, with leakage thus detected, may be sealed again before its contents become ruined due to exposure to oxidation or to atmospheric contamination. When a sealed package is placed within a chamber and the chamber atmosphere is then reduced, the package will bulge due to the reduced outer pressure on the package. By determining that a bulge has in fact occurred, and that the bulge has remained for a fixed period of time, it can be determined that the package is airtight and passes the inspection. If, on the other hand, the bulge reduces in size within a prescribed period of time, this indicates a leak is present in the package and it should then be rejected for repair, repackaging or other salvage operation. If there is no initial expansion of the package to create a bulge, this also signifies a bad leak and this package also would be rejected.

An ideal method of testing for leaks in hermetically sealed packages is one capable of continuous operation at a rate necessary to accomplish 100 percent inspection of packages produced at reasonable production line speeds. It is one which requires a minimum of adjustment to equipment to compensate for differences in package sizes or shapes, that is capable of fully automatic operation and that requires a minimum of expenditures for initial, operating and maintenance cost of equipment. Such a method and apparatus would be capable of testing packages without damage to or destruction of the package or its contents.

Present test methods are not satisfactory in two important respects. First, they can be damaging or destructive to the package and its contents. Secondly, they are too slow, and thus costly to implement, and are entirely impracticable for high levels of inspection required to insure reliability of delicate and complicated mechanisms, such as missile and space systems and vehicle components. Heretofore it has been common practice to test for leakage in a package by submergence in water and checking for bubbles which would indicate leakage. This, of course, is very unsatisfactory since leakage of water into the package occurs in many cases, and moisture contaminates the package contents. Because of this danger, and also because it is time consuming, random sampling is the usual testing procedure, so that many packages in a given shipment are not actually tested. Since random testing is not as reliable as 100 percent testing, the testing of each package is preferred.

Rigid packages, such as tin cans for example, may be checked in another method by measuring the flexure of the semirigid lid under appropriate inner and outer pressures. In one such embodiment, further identified and described in a patent to Hicks, Number 1,974,026, the contents are sealed in a vacuum and the Hicks instrument is then placed on top. A vacuum over the lid under certain conditions, will tend to cause the lid to flex outwardly by certain amounts, assuming that this vacuum operates against a certain inner pressure within the can. If the amount of deflection does not fit within a certain range established for a particular lid resiliency, thickness, package internal pressure, etc., this "wrong" deflection indicates that the vacuum or pressure within the can against which the vacuum on the lid has been exerted is not within the properly defined limits set for this can, and the can is rejected. The can may be sealed with the wrong internal pressure or the can may leak. Either defect will cause a rejection. The Hicks device assumes that a good can properly sealed will have certain inherent properties and that by reducing the pressure on the lid and sampling one property, the lid deflection, the condition of the can may be determined. In reality, he is chacking the seal integrity of the can lid, whether it has a hole in it or not, and whether the can was sealed with the right pressure in it. This device would not accept or reject sealed packages with varying internal pressure. This becomes evident when the pressure in the can is equal to atmospheric pressure and the lid deflects the maximum. A hole in the side of the can would have no effect on readings of the Hicks device. The only hole that would be significant would be a hole in the lid or diaphragm in this case. Under this latter circumstance, the lid or diaphragm would not move and the can would be rejected.

Another testing device is disclosed in the patent to Zimmerman, Number 3,117,441. This apparatus is meant for mass assembly line testing of identical packages and requires manual adjustment whenever other packages are tested or the size of the package is changed. This apparatus has a disadvantage also, in that rejections will be caused if the initial sealing of the package was not within tolerance limits of pressure. When the Zimmerman device is used on a package having an improper initial inner pressure, indicating electrical contacts will break and thus indicate a defect, even when the package was, in fact, hermetically sealed at the time of the test.

Summary of the invention

The apparatus within which the features of the present invention reside, is used for the purpose of detecting leakage, and is not concerned with the initial pressurization condition in the package. It will accommodate variations in such inner sealing pressures and determine if there is leakage in the package. The apparatus utilizing the principles of the present invention is devoted to the determination that a bulge in the package will exist when a reduced pressure is applied outside the package, and that this bulge will maintain itself over a predetermined time, to thus indicate that no leakage exists. This is without regard as to the initial pressure within the package. The apparatus quickly and readily adapts itself to various sizes and configurations of packages for which the test is desired.

Briefly, the apparatus in one embodiment utilizing the present invention comprises an adjustable chamber into which the test package is placed, manually or by automatic conveyor apparatus. The roof of the chamber lowers until a sensing device senses the top of the package. Thereafter, the side walls move up to engage the roof of the chamber in an effective seal to permit the chamber to become reduced in pressure, causing the package to bulge. If the bulge sustains itself for a prescribed time interval, the package has passed its leak test, after which the chamber sides move down and the roof moves up to permit entry of another package for testing.

It is therefore an object of the present invention to provide for a new and improved non-destructive quick leak tester for sealed packages.

Antoher object is to provide for a testing device for sealed packages wherein the inner pressures from one package to another may vary without interfering with or changing the result of the test.

Still another object of the present invention is the provision of a testing machine for sealed packages wherein leakage of a package within certain tolerance limits may be checked without damage to the package or its contents.

Still another object is the provision of a non-destructive test device for sealed packages wherein various sizes and configurations of packages may be quickly and readily tested.

A further object is the provision of a non-destructive leak tester for sealed packages wherein neither the seal nor the contents of the package are destroyed under the test.

These and other advantages will become more apparent as a description of the apparatus proceeds, now having reference to the drawings wherein:

*Brief description of the drawing*

FIG. 7 is an operating schematic illustration showing the hydraulic and pneumatic equipment.

FIG. 8 is an electrical circuit used in the testing device.

*Description*

Figure 1:
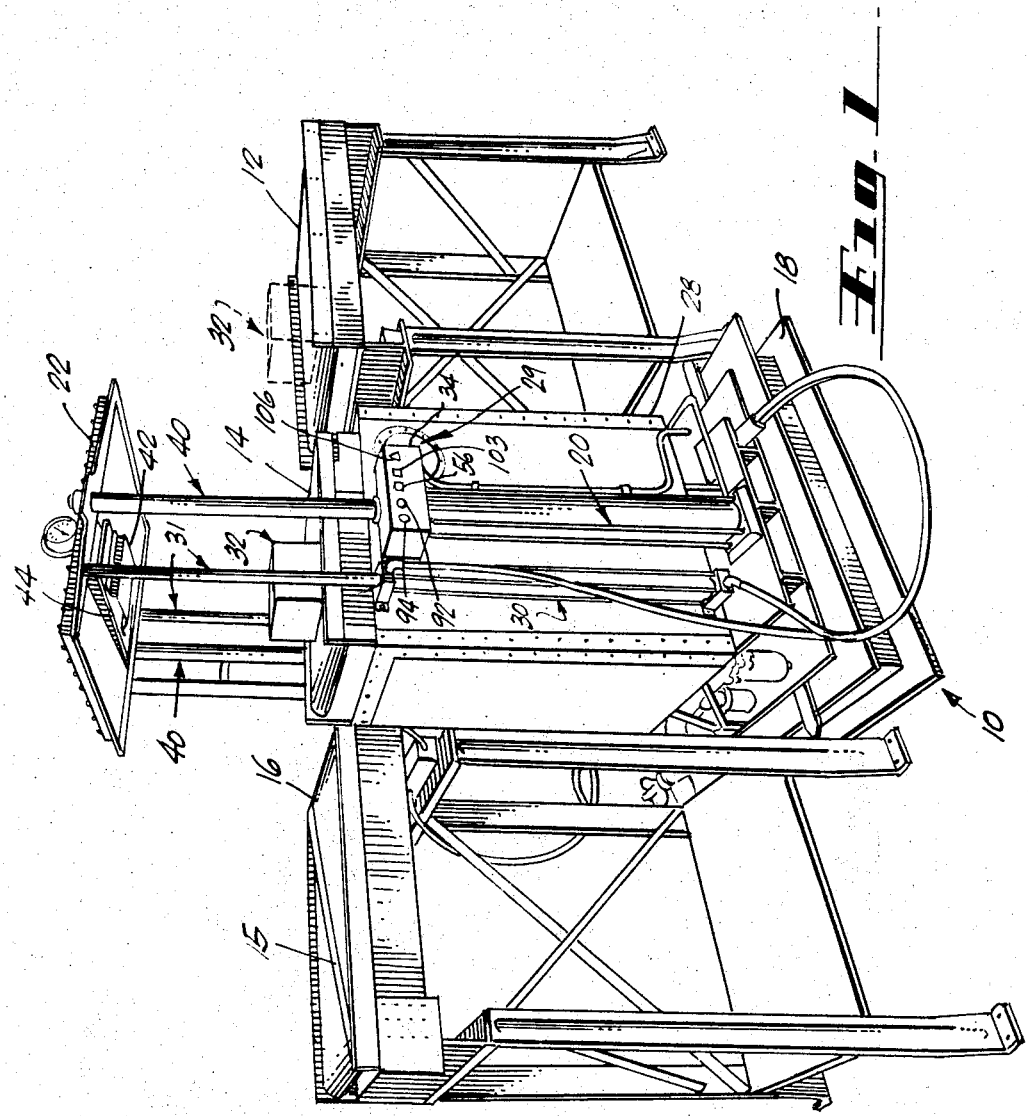
FIGURE 1 is a perspective view of the non-destructive leak tester.

Referring now back to FIG. 1, there is shown the basic unit 10, surrounded by its auxiliary conveyors, a supply conveyor 12, test conveyor 14 and discharge conveyor 16. These conveyors are incorporated into this machine to facilitate a completely automatic machine. The supply conveyor meters the package to be leak tested, into the machine by an electrical driven motor within it (not shown). After the test the package moves from the test conveyor 14 to the discharge conveyor 16. Microswitches located on the respective conveyors control the sequencing for the operation of the respective conveyors, as well as the preceding conveyor. This will be discussed hereinafter in the operation of the fully automatic machine.

The basic unit 10 is mounted on a channel base 18, on top of which is located two hydraulic cylinders, one of which is shown and identified by numeral 20 and the other is on the opposite side and hidden from view. At the top of the hydraulic chamber is mounted the test chamber roof 22. To the chamber roof 22 and to the vertically movable chamber side walls 28 are connected two air cylinders 30. On the channel base 18 is mounted all the auxiliary hydraulic and pneumatic equipment that is required for the successful operation of the basic unit 10, in such a manner as to be housed within the confines of side walls 28 to allow the walls to move up and down without interfering with any of the hydraulic or pneumatic equipment.

When the chamber roof 22 is lowered and the chamber side walls 28 are raised, a square enclosure is formed of variable height. In one such embodiment, this enclosure will accommodate a package measuring up to 23" x 23" x 15", although of course, the present invention is not limited to such dimensions. Since the height of the chamber adjusts to suit the height of the package, it has an additional advantage of minimizing vacuum flow by achieving an atmosphere from 5 p.s.i.a. to 15 p.s.i.a. in a minimum volume. The basic unit 10 is preferably of the size of a typical home refrigerator, weighing under 1000 pounds and has a capacity of a testing time cycle of under 60 seconds.

The test table 26, shown in FIGURES 2, 3, 4, 5 and 6, is a steel plate welded to a cylinder which serves as an air accumulator 24. The table is rigid enough to permit only a .001-inch maximum deflection during a package test. The test chamber side walls 28 are four sides of a hollow square surrounding the test table 26 and are free to travel vertically. During the test cycle, these walls rise vertically to meet and join the test chamber roof 22. The top edges of the side walls have a rubber seal that seats against the under periphery of the roof. Window 29, shown in FIGURE 1, permits visual observation of a test in progress.

Two 2½" diameter air cylinders 30 are attached to opposite sides of the chamber walls 28. The cylinder rods 31, driven from these air cylinders, are attached to the chamber roof 22 and compressed air to these cylinders provides the force that joins the walls and roof at the correct height during the test cycle. The hydraulic cylinders 20 restrain or lock the chamber roof 22 in its ready position of maximum height and in its test position just above a package under test. A sensing device 42 is a sensing arm which activates switches that cause the descending test chamber roof 22 to stop and become locked at the desired precise height above a test package, and "read" and "report" the reaction of the test package to the reduced pressure within the sealed test chamber. A powered conveyor system consisting of three separate units, one which sets inside the test chamber and two others placed at each side of the test chamber, provide means for fully automatic movement of packages into, test, and movement out of the test chamber. These conveyors are intended to be used in conjunction with a production line conveyor system. The three conveyor units 12, 14 and 16 are of similar construction employing chain link type belts powered by individual electric motors through a reduction gear. The receiving or supply conveyor 12 and the discharge conveyor 16 are mounted on stands which make the belts substantially level with the belt on the test chamber conveyor unit which sets inside the test chamber. The supply conveyor is placed on the side of the test machine to the right. A pair of positioning lugs mounted on the test machine base assure correct alignment. Electrical connection is made by means of a multiwire plug which engages a receptacle mounted on the test machine base. The test chamber conveyor sets on the test table pneumatic tube assembly with two aligning pins keeping it in proper position. It is not bolted in place and may easily be removed by lifting it up and out. Electrical connection is by means of an electrical connector which is under the conveyor belt at one corner of the unit. The discharge conveyor 16 is placed on the side of the test machine opposite the receiving conveyor 12. It is also positioned and aligned by a pair of lugs mounted on the test machine base. A multiwire plug provides electrical connection through a receptacle mounted in the side of the junction box on the test machine base. The discharge conveyor is equipped with a diverting arm 15, powered by a solenoid actuated by the "Accept"–"Reject" signal from the test sensing switch in the test chamber. If an Accept signal is received, the arm 15 is held in position to guide the carrying tray in a straight path from the test chamber. If a Reject signal is received, the arm is drawn across the conveyor belt thereby diverting the carrying tray out of the path for Accept packages. Control of the conveyors is interlocked electrically so that they are started and stopped in proper sequence to control movement of the package, on its carrying tray to assure proper alignment in the test chamber and that one package does not interfere with another in movement through the machine. Microswitches, (not shown) activated by passing of the package carrying tray, are mounted on the conveyor units. As a tray leaves the receiving conveyor a switch, mounted at the center of the end of the conveyor toward the test machine, is tripped causing the receiving conveyor 12, to stop. As the tray approaches test position in the test chamber, it trips a microswitch mounted at one side and causes the test chamber conveyor 14 to stop. When the test cycle is completed, the test chamber sides in lowering actuate a switch which causes the test chamber conveyor 14 to restart. As the tray leaves the test chamber and passes over the discharge conveyor 16, it trips microswitches, mounted at the center and the end of the conveyor toward the test machine, which restarts the receiving conveyor 12 and causes the next tray to start through the test chamber.

The basic unit 10 can be operated without the automatic conveyor units 12, 14 and 16 which are, in a sense, accessories to it. When operated without the conveyors, the package to be tested is placed in, and removed from, the test chamber manually. Each test cycle is started by manually pressing the start button 56. The machine stops automatically at the end of the test cycle. This use of the machine is referred to as the semiautomatic mode.

When the conveyor units are installed and attached, operation is completely automatic. Package are automatically transported into the test chamber, tested, and then automatically transported out of the test chamber and directed in one direction if an Accepted package or diverted to another direction if a Rejected package. In either the full automatic or the semiautomatic modes, the test cycle itself (e.g., closing of the chamber, pulling a vacuum, sensing of package reaction, signal of Accept or Reject and opening of the chamber) is accomplished in identical automatic fashion.

Figure 2:
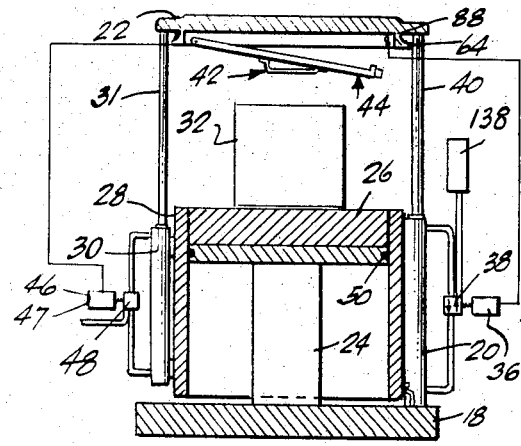
FIGS. 2, 3, 4, 5 and 6 are schematic illustrations of the sequence of operations of the machine in testing a package.

Reference is now made to FIGS. 2 to 6 to show the sequence of operations of the basic unit and to the schematic illustration in FIG. 7 showing the hydraulic and pneumatic equipment. In FIG. 2, a package 32 is shown positioned on test table 26 ready for test. The chamber roof 22 is fully extended and the chamber side walls 28 are completely retracted. To close the chamber so that its pressure may be reduced, a start button on electrical box 34, mounted on the side of unit 10 is depressed. This energizes the coil 36 on the hydraulic solenoid valve 38, causing hydraulic fluid to flow from the bottom of hydraulic cylinder 20 to the top. This lowers cylinder rod 40, and chamber roof 22, until sensing device 42 on lever 44 contacts the package 32. This, in turn, causes coil 36 on solenoid valve 38 to deenergize, thus stopping the hydraulic actuation and the further lowering of chamber roof 22.

Figure 3:
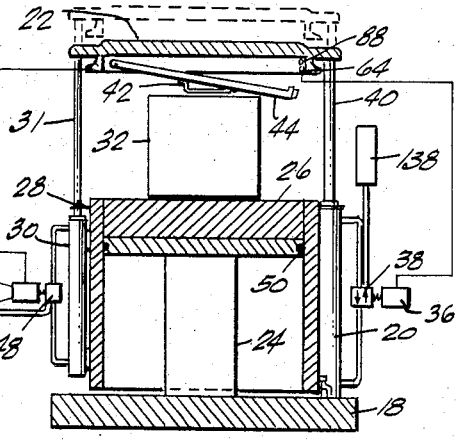
Figure 4:
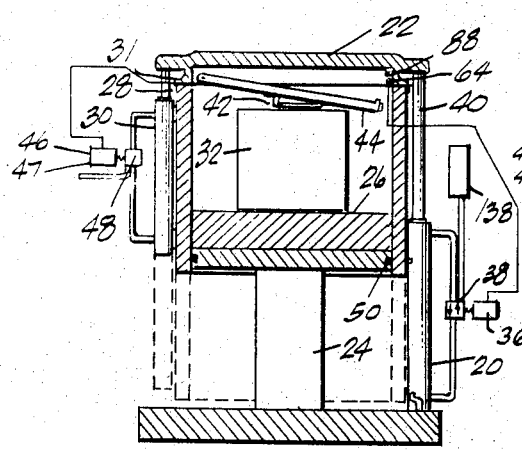

At the same time that hydraulic solenoid valve 38 is operated, coil 46 on pneumatic solenoid valve 48 is also energized, permitting pressurized air to enter the top of pneumatic cylinder 30, thus helping to lower chamber roof 22. When the chamber roof has stopped its descent, caused by sensing device 42 contacting the package 32, the air pressure on the top of cylinder 30 causes the chamber side walls 28, to which it is attached, to move upwardly to meet the chamber roof 22, which is no longer being lowered. FIG. 3 shows the chamber roof 22 lowered until sensing device 42 contacts package 32, and FIG. 4 shows the chamber side walls 28 engaging chamber roof 22 in an airtight seal.

Figure 5:
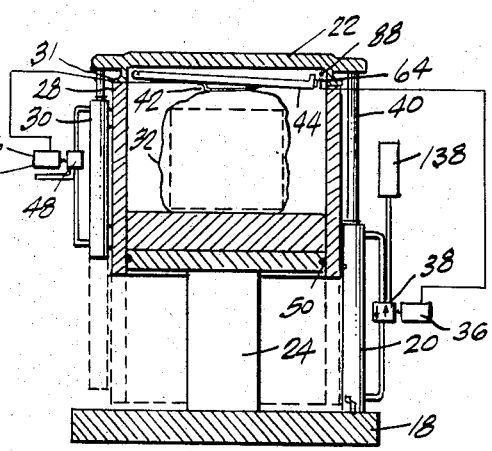

Before the chamber is reduced in pressure to approximately one-half atmosphere, a seal must be formed between the test table 26 and the lower edge of chamber side walls 28. This is done with an inflatable tube 50 which is inflated to a predetermined pressure by appropriate apparatus actuated upon engagement of the chamber side walls 28 with chamber roof 22. When tube 50 has been inflated to a preset pressure, the chamber is then reduced in pressure, causing the package 32 to bulge, as shown in FIG. 5. This bulge raises lever arm 44 to near horizontal position to close appropriate switches for a sufficient length of time to signify that the package has an airtight seal. If the arm moves within this preset time, the switches will break to indicate the package is leaking faster than may be tolerated. If the package leaks too fast to sustain the closed switches for this desired length of time, or if the package fails to bulge sufficiently to close the switches, a leaking package is indicated. Suitable lights or other indicating devices (not shown) may be used to indicate the condition of the package.

Figure 6:
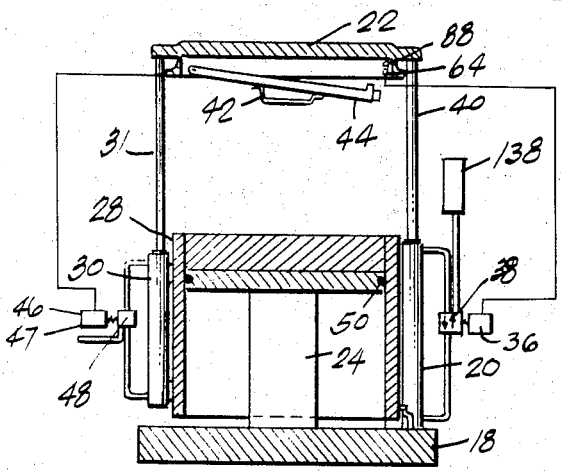

After the package has been tested, the sequence of operating steps is then reversed. The chamber is returned to normal pressure, sealing tube 50 is deflated, the chamber side walls 28 are lowered and the chamber roof 22 is raised. The testing unit is now ready to receive the next package, as shown in FIG. 6.

The operating hydraulic and pneumatic equipment is schematically illustrated in FIG. 7 and the electrical circuits are shown in FIG. 8. Reference is now made to both drawings.

While the circuit in FIG. 8 is for a fully automatic machine, which includes the supply conveyor, test conveyor and discharge conveyors, the semiautomatic machine will first be explained, and then the automatic innovations. At the left of the drawing in FIG. 8 is a conventional plug 52 for connection with a 110 volt AC 15 ampere source of power for the circuit. The circuit can be understood best by following the sequence of operating steps of the test. Initially, a start button is pressed which energizes start relay 54, closing all of the contacts within the dotted line 56. Relay 54 holds the contacts in the closed position until the circuit is broken at some other point at the end of the test cycle. The closing of the contacts within the dotted line 56 energizes relay 58, closing all of the contacts associated therewith. This, in turn, transmits power through contacts 60 to the hydraulic valve solenoid 36, which in turn actuates valve 38, shown in FIG. 7. When this valve 38 is open, hydraulic fluid then may be transferred from the bottom of hydraulic cylinder 20 to the top, thus permitting chamber roof 22 to be lowered. At the same time, power is transmitted through contact 62 to one of the air valve solenoids, 47, which operates air valve 48. This puts air pressure from air supply 82, on the rod end of air cylinder 30, which helps force the chamber roof 22 to be lowered. Chamber roof 22 proceeds downwardly until the sensing arm (44 in FIG. 2) underneath the chamber roof 22, contacts the test package and thus closes sensing switch 64. This closing of switch 64 energizes relay 66 which, in turn, deenergizes the hydraulic valve solenoid 36, thereby closing hydraulic valve 38. The closing of hydraulic valve 38 locks the chamber roof 22 in a fixed vertical position with sensing device 42 in contact with the package 32. The solenoid 47 continues to hold open the pneumatic solenoid valve 48 which continues to pressurize the rod side of the air cylinder 30, to thereby raise the chamber side walls 28 until engagement is made with the chamber roof 22. When this happens, contacts 68 close to energize relay 70 for the purpose of inflating the tube 50 between the test table 26 and the test chamber side walls 28. This is done when relay 70 energizes solenoid 74 to open air valve 75. Regulator 72 controls the pressure on the tube to no more than approximately 15 p.s.i. Solenoid 76 is also energized to open vacuum valve 78. This permits communication between the vacuum chamber 24 below the test table 26 and the newly formed test chamber above it. Since the vacuum chamber 24 is at a reduced pressure, it tends to withdraw air from the test chamber to thereby lower its pressure in a very quick and expedient manner. The atmospheric pressure within the chamber is thus reduced to a predetermined partial vacuum of from 5 to 15 p.s.i.a. At this point, it should be noted that the vacuum chamber 24 is subjected to reduced pressure through vacuum pump 80 which is, in this case, an air ejector connected to a standard p.s.i. source of air 82. When the desired test vacuum within the chamber is reached, such vacuum being preset manually on a switch, the vacuum switch 84 closes, putting power on a time delay relay 86. As vacuum is drawn on the chamber, the package 32 within the chamber swells, causing the test switch 88 to close and energize relay 90. If the package is good after the test time delay period, typically less than 10 seconds, which has been manually preset on the relay 86, the time delay relay 86 closes, and relay 90 causes the green Accept light 92 to light. If test switch 88 fails to close, or closes and then reopens before the expiration of the time delay, relay 90 is not energized and as a result, the red Reject light 94 is lighted instead of the green Accept light 92. Also, in the automatic system, the solenoid 96 in the circuit of discharge conveyor 16 diverts arm 15 (shown in FIG. 1), to divert the package to a reject rail, because test switch 88 failed to close and energize relay 90.

At the end of the prescribed time delay, relay 86 energizes to switch contact 87 to thus remove power from solenoids 74 and 76. This allows the seal to be broken in the test chamber, so that the walls may be lowered. This results from the valve 75 switching from the pressure source to the vacuum source to thereby collapse the tube and valve 78 to cut off communication between vacuum chamber 24 and the test chamber. When the vacuum is thus broken, vacuum switch 84 is also broken to thereby deenergize time delay relay 86. When relay 86 is deenergized, power is removed from relay 98 which removes power from relay 100, to thus shift contact 62. This will cause reversal of the pneumatic solenoid valve 48 by energizing solenoid 46. When this happens, the chamber side walls 28 move down, closing switch 102 at the bottom of the downward movement. This switch 102 applies power to the solenoid 36 of hydraulic valve 38, opening the valve to permit free flow of hydraulic fluid (and thus unlock the vertical position of chamber roof 22), and thus allowing the air cylinders 30 to force the chamber roof 22 upwardly. When the chamber roof 22 reaches its upper vertical limit, it opens switch 104, deenergizing start relay 54 to end the test cycle.

Switch 106 determines whether the test unit is to be run in a semiautomatic condition, that is, without the conveyors, or in the automatic position in which the conveyors are used. In the fully automatic mode, switch 106 is with the contacts in the position shown, so that switch 104 starts the test conveyor 14 and discharge conveyor 16 through relay 108. When a package moves out of a test chamber onto a discharge conveyor 16, it trips switch 110, which starts the supply conveyor 12 to deliver a new package into the test chamber. When the new package leaves the supply conveyor 12, switch 112 is tripped, thereby energizing relay 114 and relay 116, which controls the motor 118, and deactivates the supply conveyor 12.

The package moves on the test conveyor 14 until it contacts switch 120, which stops the test conveyor 14 with the package in the proper position. This is done by deenergizing relay 108 and start relay 54 is energized to repeat the cycle.

The transformer 122 and diode rectifier 124, provides a six volt DC source which operates the coils on relay 108 and 54 while the resistors 126 and 128 protect the coils from burning out. If, during the test cycle, whether in the automatic or semiautomatic mode, it is desired to stop the cycle operation, a reset switch 130 can be manually depressed, closing relay 132 and short-circuiting the system. This returns the system to the start condition. Relays 98, 108, 134, 58 and 136 are in the system to provide the proper sequencing of the tester unit by energizing or holding a particular circuit while the specific relay is energized, breaking the secondary circuit. This is necessary, as the relays are multi-purpose relays and are serving a dual purpose to thereby reduce the number of relays required. In this manner, a first circuit controlled by the relay will be transferred to another relay, so that the actuation of the first relay will not break the second circuit controlled thereby. It should be noted that the tester unit is designed for a step sequencing operation rather than a time sequencing one. This means that the succeeding step in the time cycle or operation will not be performed until the previous one is completed. Thus no steps are skipped because a timing device was slowed down or speeded up for some reason.

To convert the machine from semi-automatic to fully automatic with the conveyors, all that is necessary is for switch 106 to be placed in the automatic position and for the conveyors to be placed in proper position and electrically plugged into the electrical system.

One of the basic fail-safe features in the machine is that the machine assumes a package is "bad" until it is proven to be acceptable. Thus, if the machine begins to malfunction, it will reject packages rather than accept them.

Having thus described an embodiment within which the principles of the present invention are utilized, it is to be understood that many variations and many modifications are to be expected, and such deviations from the specific embodiment thus described are intended to be within the scope of this invention as defined by the following claims.

We claim:
1. A non-destructive quick leak tester comprising:
 a variable volume cabinet within which a package under test may be placed, said cabinet having a roof thereon that may be vertically adjustable to vary the volume within said cabinet;
 means for adjusting said roof vertically to vary the volume within said cabinet and to bring said roof into a predetermined vertical relationship with said package;
 a sensing device mounted under said roof for establishing said predetermined vertical relationship of said roof with said package;
 means for reducing pressure within said cabinet to thereby cause said package to bulge; and
 indicating means to indicate whether said package is in a bulged condition.
2. A non-destructive quick leak tester comprising:
 a chamber into which said package may be placed, said chamber having a vertically movable roof;
 means for adjusting said roof vertically to vary the volume within said cabinet and to bring said roof into a predetermined vertical relationship with said package;
 sensing means for positioning said roof in said predetermined relationship relative to said package;
 said chamber having vertically movable sides;
 means operable after said roof has been positioned relative to said package for engaging said sides with said roof in air-tight relationship; and means for reducing the pressure within the said chamber to thereby make said package bulge if in hermetically sealed condition.

3. A non-destructive quick leak tester comprising:

a chamber in which said package may be inserted, said chamber having a vertically adjustable roof and vertically movable side walls engageable therewith;

an adjustable column supporting said roof in selected vertical positions; and actuating means interconnecting said roof and side walls for imposing relative movement therebetween to thereby engage said walls and said roof in air-tight relationship.

4. A non-destructive quick leak tester comprising:

a chamber in which said package may be inserted, said chamber having a vertically adjustable roof and vertically movable side walls engageable therewith;

an adjustable column supporting said roof in selected vertical positions, said column including a hydraulic cylinder and actuating apparatus therefor to lock said roof in predetermined positions; and actuating means interconnecting said roof and side walls for imposing relative movement therebetween to thereby engage said walls and roof in air-tight relationship, said actuating means comprising a piston and cylinder apparatus with actuatable means for operation thereof.

References Cited

UNITED STATES PATENTS

| | | | |
|---|---|---|---|
| 1,301,241 | 4/1919 | Fenlon | 73—52 X |
| 1,776,524 | 9/1930 | Sturcke | 73—37 |
| 2,339,639 | 1/1944 | Henszey | 73—45.4 |
| 2,391,354 | 12/1945 | Slosberg | 73—52 |
| 2,453,338 | 11/1948 | Pajak | 73—52 X |
| 2,821,951 | 2/1958 | Carver | 73—49.2 X |
| 3,117,441 | 1/1964 | Zimmerman | 73—52 X |

LOUIS R. PRINCE, *Primary Examiner.*

J. NOLTON, *Assistant Examiner.*